United States Patent [19]
Endacott

[11] Patent Number: 4,978,373
[45] Date of Patent: Dec. 18, 1990

[54] FLUID SEPARATION APPARATUS

[76] Inventor: John A. Endacott, 84 Hersham Road, Walton-on-Thames, Surrey, KT12 5NU, England

[21] Appl. No.: 438,402
[22] PCT Filed: Mar. 7, 1989
[86] PCT No.: PCT/GB89/00241
 § 371 Date: Dec. 20, 1989
 § 102(e) Date: Dec. 20, 1989
[87] PCT Pub. No.: WO89/10780
 PCT Pub. Date: Nov. 16, 1989

[30] Foreign Application Priority Data
 May 6, 1988 [GB] United Kingdom ............... 8810817
 Apr. 3, 1989 [CA] Canada ............................ 595519

[51] Int. Cl.$^5$ .................................................. B01D 19/00
[52] U.S. Cl. ............................ 55/165.000; 55/172.000;
   55/174.000; 55/356.000
[58] Field of Search ............................. 55/171–177,
   55/165, 169, 356

[56] References Cited
U.S. PATENT DOCUMENTS

| | | | |
|---|---|---|---|
| 1,559,115 | 10/1935 | Marker et al. | 55/174 |
| 2,657,760 | 11/1953 | Glasgow | 55/176 X |
| 2,664,963 | 1/1954 | Lovelady et al. | 55/174 |
| 2,710,071 | 6/1955 | Kinser et al. | 55/176 X |
| 2,899,014 | 8/1959 | Sinex | 55/174 X |
| 3,435,595 | 4/1969 | Skelton | 55/174 X |
| 4,254,626 | 3/1981 | Anderson | 60/641 |

FOREIGN PATENT DOCUMENTS
 45211 3/1964 Luxembourg .

OTHER PUBLICATIONS
Patent Abstracts of Japan, vol. 11, No. 89 (C-411) (2536), Mar. 19, 1987 & JP, A, 61242683 (Hitachi Ltd.), Oct. 28, 1986, see abstract.
Patent Abstracts of Japan, vol. 7, No. 46 (C-153)(1191), Feb. 23, 1983 & JP, A, 571972002 (Tokyo Shibaura Denki K.K.), Dec. 3, 1982, see abstract.
Patent Abstracts of Japan, vol. 4, No. 77 (c-13)(559), Jun. 4, 1980 & JP, A, 5544347 (Tokyo Shibaura Dekni K.K.), Mar. 28, 1980.

Primary Examiner—Charles Hart
Attorney, Agent, or Firm—Laurence R. Brown

[57] ABSTRACT

Apparatus for separating gases and liquids comprise a vessel adapted to receive a mixture of gas and liquid and consisting of an upper tank (1) and a lower tank (2) which are interconnected by a plurality of tubes (3, 4, 5). A first one (3) of these tubes is centrally located in the upper wall of the lower tank (2) and the remaining tubes (4 and 5) are equi-spaced on either side of the central tube (3) and are also located in the upper wall of the lower tank (2). A gas/liquid mixture is introduced into the upper tank (1) via an inlet nozzle (8) and baffles (9) aid in separating liquid. The separated gas can be collected from an outlet (12) while the liquid passes down the tubes into the lower tank (2). The level of liquid in the lower tank is adjusted so that the liquid extends up into the tubes (3, 4, 5). As a result, there is very little interface between the gas and liquid and separation is not impaired even if the vessel is subjected to movement caused by, for example, wave action on a floating vessel or platform.

12 Claims, 4 Drawing Sheets

FLUID SEPARATION APPARATUS

This invention relates to a fluid separation apparatus and is particularly concerned with the control of surges of liquids such as oil or water in such apparatus on floating and moving vessels or vehicles.

The invention is principally directed to floating oil production platforms where oil flows from an underground oil reservoir via a well to the production platform where the oil is separated from associated gas and water present in the reservoir fluid. The gas is normally separated and used as fuel and the remainder is either flared, exported or reinjected into the reservoir. The water is separated and treated to remove entrained oil and then discharged. The crude oil is exported by subsea pipeline to either a tanker or to shore by pipeline.

The reservoir fluid is normally separated in two separate phases, in situ, because the transfer of a multi-phase fluid through a pipeline to shore is difficult because of the high. pressure drop in the pipeline caused by "slugging" of the liquids in the liquid/gas mixture. Multiphase transfer is possible in relatively short pipelines or flowlines but is uneconomic in longer pipelines.

Existing separators used on floating vessels to separate gas, oil and water from reservoir fluids, consist of a cylindrical tank with the oil/gas interface along the length of the tank. During movement of the vessel, due to motion of the vessel because of wave and/or wind action in inclement weather, the tank is inclined in all planes to varying degrees to the horizontal resulting in the liquid level moving in relation to the tank causing waves and "sloshing" of liquids within the tank. Existing tanks are fitted with baffle plates and liquid non-return devices in an attempt to minimize the effect of the problem of the liquid movement and the consequent reduction in efficiency of the gas/oil and oil/water separation. Thus existing designs attempt to find a solution to the effect of the problem.

The present invention aims to overcome the problem itself by limiting the liquid movement and maintaining efficient separation.

According to the present invention, there is provided apparatus for moving vessel or vehicle for separating gases and liquids, said apparatus comprising a container adapted to receive a mixture of gas and liquid and consisting of at least two tanks which are connected by a plurality of tubes, each tube being located in the upper wall of a first tank which is located at a lower level than a second tank and said tubes being spaced apart, and means to maintain the liquid/ gas interface at a substantially constant level within each tube so as to reduce agitation of the liquid/gas interface during movement of the vessel or vehicle.

Preferably the tubes comprise a first tube and at least one second tube located on each side of said first tube and spaced therefrom.

The second tubes are desirably equi-spaced from the first tube on either side thereof in which case they are preferably of equal cross-section or diameter.

Preferably, said means to maintain the liquid/gas interface at a substantially constant level within each tube are located at least in the first tube. These means may comprise a standpipe in the centre of the first tube having liquid level control connections to ensure that the level remains constant no matter to what degree of movement to which the vessel is subjected.

The second tank may be arranged horizontally parallel to and above the first tank or it may extend vertically above said first tank.

The first tank may be larger, the same size or smaller than the second tank although the first, lower, tank should desirably be the larger of the two.

In a preferred construction, the connecting tubes extend into the tanks and terminate in the interiors thereof. This arrangement minimizes the distance between the tanks thereby reducing the total height of the apparatus and retaining sufficient hold up time for variations in level for adequate control combined with the maximum angle of the apparatus to the horizontal.

The invention will now be described, by way of example, with reference to the drawings, in which.

Figure 1:
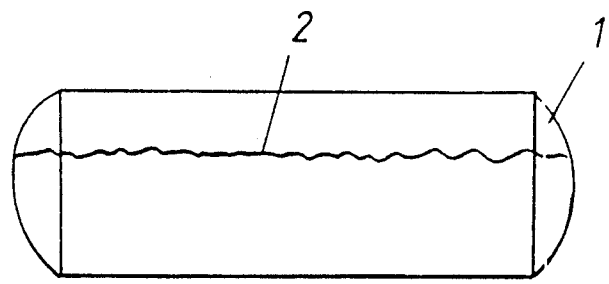
FIG. 1 is a diagrammatic view of a conventional separation tank in a horizontal position.
Figure 2:
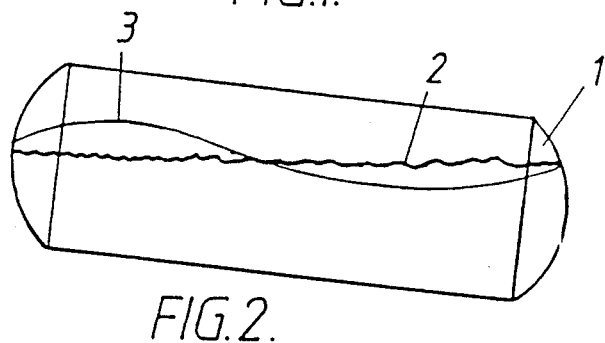
FIG. 2 is a similar view to FIG. 1 of the tank in an inclined position.

Reference will first be made to FIGS. 1 and 2 of the drawings which show a conventional separator used to date and in which the separator consists of a single cylindrical horizontal tank 1 with a gas/liquid interface 2 over the whole length of the tank. When the separator tank 1 is inclined, as shown in FIG. 2, by the pitching and rolling motion of a floating vessel on which the tank is mounted, the liquid level changes forming waves 3 which move to and fro along the length of the tank causing turbulence and mixing the fluid phases to be separated. To overcome this problem baffles and non-return devices (not shown) are used to try and arrest the liquid movement and so minimize the loss in separation efficiency. Such baffles and non-return devices have not however proved to be very efficient in practice and require a larger tank compared to a similar tank designed for a stationary location.

Figure 3:
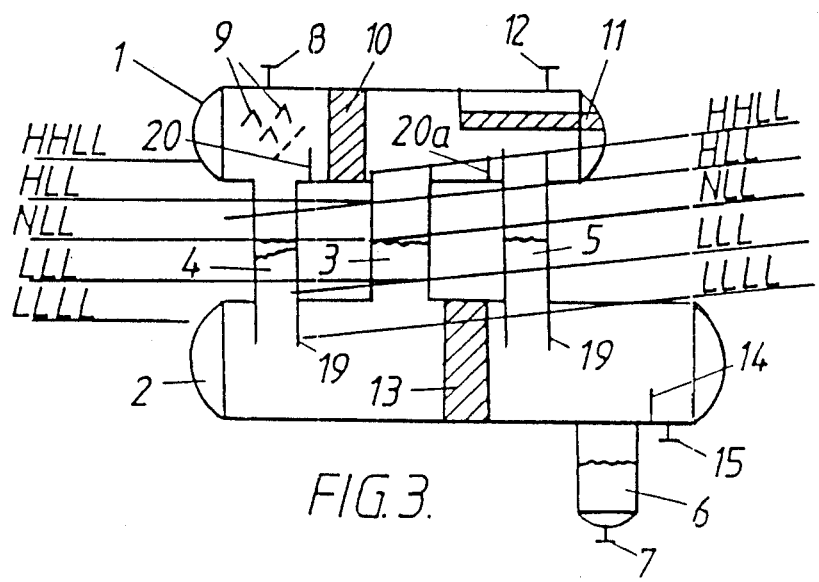
FIG. 3 is a diagrammatic side elevation of a first embodiment of a fluid separation apparatus according to the present invention.

In the first embodiment of the fluid separation apparatus according to the invention which is shown in FIG. 3, the separator comprises two horizontal cylindrical tanks, an upper tank 1 and a lower tank 2. The upper tank is connected to the lower tank by three vertical downcomer tubes, a central downcomer 3 and two outer downcomers 4 and 5 which are equi-distant from the central downcomer 3. The lower tank 2 has a boot 6 at the bottom of the tank with a water outlet nozzle 7.

The two or three phase mixture, i.e. oil, gas and water is supplied to the upper tank 1 at the inlet nozzle 8 and the velocity of the mixture is decelerated by an arrangement of baffles 9 which serve to separate the gas from the liquid. The gas which contains liquid droplets passes through a standard gas coalescer pack 10 which assists separation of the liquid content to the required specification. The gas then passes onto an outlet mist coalescer 11 and can be fed off through an outlet nozzle 12.

The gas velocity along the upper tank is designed to allow the liquid droplets of a particular specified size to separate and fall to the base of the upper tank 1 and then flow to the lower tank 2 down one of the downcomer tubes.

The separated liquid at the inlet end of the upper tank 1 flows down to the lower tank 2 under gravity. A weir 20 is located between the downcomers 3 and 4 to reduce any overflow of liquid further along the upper tank 1 due to a sudden surge of inlet fluid. Once in the lower tank, the liquid flows along the tank at a low velocity to enable the water and oil to separate and the water to collect in the bottom of the tank 2 and flow to the water boot 6.

The liquid can flow through a standard coalescing pack 13 to aid separation of the oil and water. The oil flows over a second weir 14, which is provided as a precaution against a build-up of water flowing to the oil outlet, and out through an oil outlet nozzle 15. The water is collected at the nozzle 7 of the boot 6.

The three phase fluid is normally supplied to the inlet 8 of the separator at a constant rate and a liquid level is established and controlled so that the level is within the height of the downcomer tubes. Under normal pitch conditions, the liquid does not flow into the upper tank 1 and the gas does not flow into the lower tank 2. Typically the level would be controlled between 30% and 70% up the central downcomer tube 3. When the vessel is level, the liquid level in all three downcomer tubes is the same. When the separator is inclined due to pitching of the vessel, the liquid levels in the downcomer tubes 4 and 5 rise and fall by the same amount so that the only movement of liquid which takes place is that in the tubes 4 and 5 and is the difference in volume between the high and low points in the downcomer tubes 4 and 5 plus a slight movement of the liquid meniscus in the central tube 3. Therefore, the large horizontal movement of liquid in a conventional separator is changed to a small vertical movement of liquid in the separator of the present invention. There is thus little agitation at the interface between the liquid and gas or between the oil and water and separation between the phases is not impaired.

The only sloshing of liquid in the separator is contained within each downcomer tube and the small area involved means that the waves formed are insignificant. In order to ensure that the level of liquid is maintained within the downcomer tubes, the Normal Liquid Level (NLL), the High Liquid Level (HLL) and the Low Liquid Level (LLL) are established and measured Within the height of the tubes. The liquid hold-up between the HLL and LLL levels is normally 15 to 30 seconds to enable the oil outlet control valve to react to sudden changes in flow rate to or from the vessel. Therefore the total volume of the three downcomers is designed to contain 15 to 30 seconds of liquid inflow. The height of the downcomer tubes is set so that no liquid enters the upper tank and no gas enters the lower tank under normal vessel pitch conditions. The outer downcomer tubes 4 and 5 can extend into the lower tank 2 at 19 and thus reduce the distance between the upper and lower tanks If the liquid should reach the High High Liquid Level (HHLL), due to blockage of the liquid outlet, the inlet feed is automatically shut down. The hold-up time between the HLL and the HHLL is normally between 30 and 60 seconds, therefore the HHLL is set in the bottom of the upper tank 1. Baffles 20a can be located in the bottom of the upper tank 1 to reduce the sloshing of the liquid along the upper vessel during this situation. A central channel through these baffles assists drainage of any liquid to the lower tank 2 via the downcomer tubes.

The Low Low Liquid Level (LLLL) which can occur if the incoming fluid is stopped or the outlet control valve malfunctions, is one minute liquid hold-up volume below the LLL. During pitching with the liquid level at the LLLL there will be a sloshing within the lower tank 2 which will reduce the separation efficiency severely but the sloshing effect will be limited to within the lower tank 2.

Levels above the HHL and below the LLL are abnormal and the hold-up times between the HHL and HHLL and between the LLL and LLLL are to enable operators to take corrective action before the plant shuts down. The number of occasions when this situation occurs is few and considered acceptable when compared to the saving in size, weight and cost of the separator.

Figure 4:
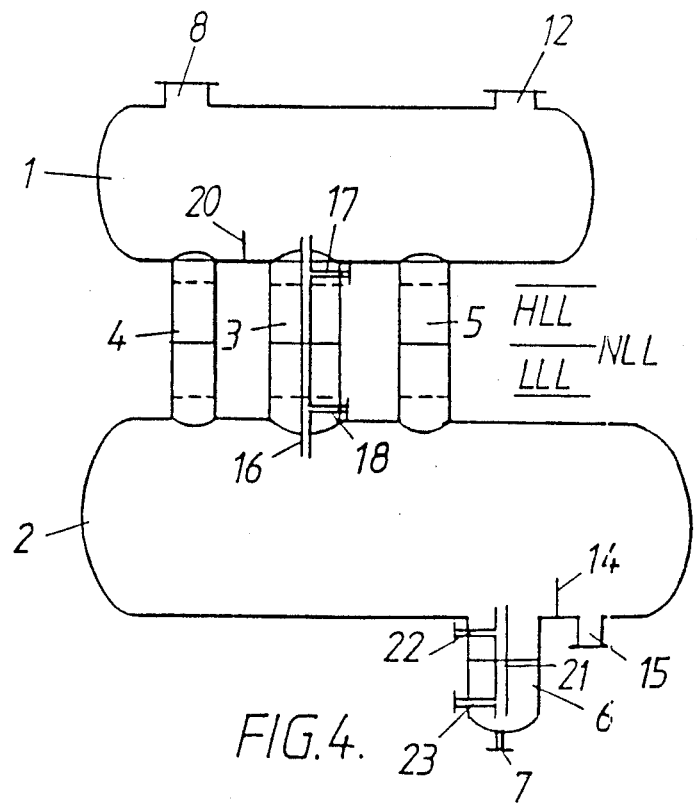
FIG. 4 is a diagrammatic side elevation of a second embodiment of a fluid separation apparatus according to the invention.
Figure 5:
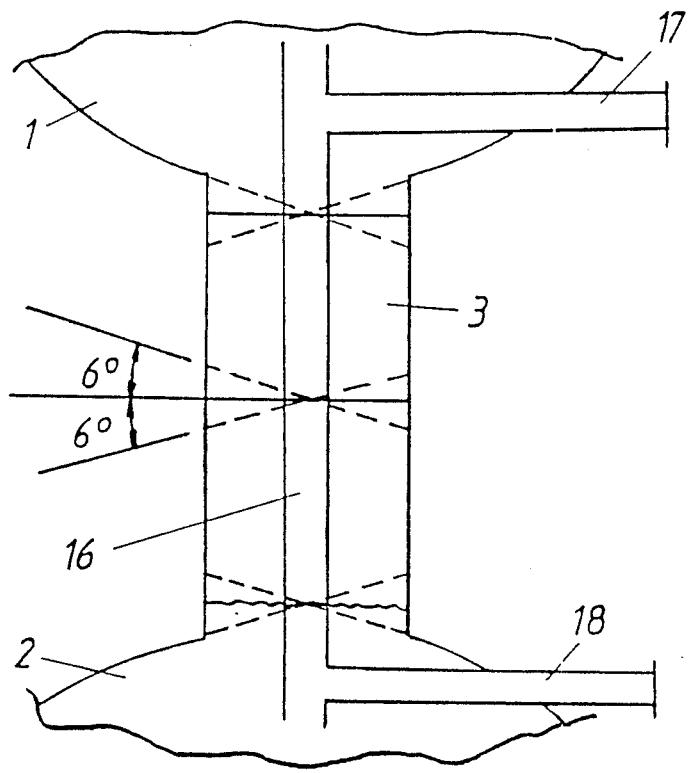
FIG. 5 is an enlarged diagrammatic fragmentary view of the central connecting tube of the apparatus shown in FIG. 4.

Control of the liquid levels may be effected by means of the embodiment shown in FIGS. 4 and 5. The average level in the central downcomer tube 3 remains the same at all times and is the average of the levels in the two outer downcomer tubes 4 and 5 so that an internal level standpipe 16, located down the centre of the downcomer tube 3, is used for level control instruments for the gas/liquid interface. The standpipe 16 has an upper liquid level controller connection 17 and a lower liquid level controller connection 18.

In the embodiment of FIGS. 4 and 5, the liquid levels in the downcomer tubes are shown at High Liquid Level (HLL), Normal Liquid Level (NLL) and Low Liquid Level (LLL). The dotted lines shown in FIG. 5 indicate the various liquid levels when the separator is inclined at a 6° pitch in either direction.

If the quantity of separated water is small then the water can be collected in the boot 6 at the liquid outlet 7. The liquid levels in the boot 6 (see FIG. 4) can be located to control the water flow rate. This can be effected using a standpipe 21 having two liquid level control connections at the upper level 22 and lower level 23. The separated water flows along the bottom of the lower tank 2 to the boot 6. The formations of waves between the liquid/water interface will be small and of low frequency, compared with the waves set up between the gas/liquid interface, because the difference between the density of the liquid and water is relatively small. Only a small degree of mixing will occur.

Figure 6:
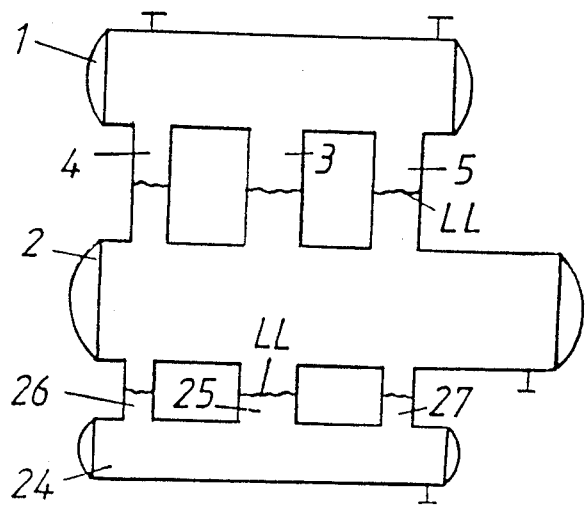
FIG. 6 is a diagrammatic side elevation of a third embodiment of a fluid separation apparatus according to the invention.

If the mixture contains a significant quantity of water, then a third horizontal tank 24 can be installed below the lower tank 2 as shown in FIG. 6. This third tank 24 can be connected by three downcomer tubes 25, 26 and 27 so that the Liquid Levels (LL) and movement of the liquid when the vessel is pitching will be similar to that hereinbefore described for the gas/liquid interface. In this case, gas is collected in the tank 1, oil in the tank 2 and water in the tank 24.

The dimensions of the tanks and downcomer tubes are selected to effect an efficient separation of the three phase fluid.

The upper tank 1 is designed to separate the liquid droplets from the gas. The gas velocity through the tank is determined by standard correlations to specify the liquid droplet size removal and limit the liquid carry over with the gas. Various commercially available coalescing and liquid separation devices can be used to assist the liquid separation from the gas.

The majority of the liquid flow to the lower tank will be via the first downcomer which will be dimensioned to ensure the maximum liquid rate that can flow by gravity without backing up into the upper tank.

The, flow through the lower tank will be determined to ensure sufficient residence time to enable water droplets of a certain size to separate from the liquid and collect in the bottom of the tank, thereby determining the water content of the liquid phase.

The pitching movement of the vessel will impulse a vertical movement of liquid in the downcomer tubes and the displaced liquid will travel through the lower tank between the two outer downcomer tubes and effect an increase and decrease in velocity to the liquid flowing through the tank depending on the degree of pitch and liquid rate. However, the change in velocity is so small that there is negligible reduction in separation efficiency.

The rolling motion of the vessel will have little effect on the liquid in a cylindrical tank as the bulk of the liquid will remain in the same physical location with the tank moving around the liquid. Only the liquid close to the tank wall will be moved due to friction between the liquid and the wall. If a coalescing plate section is within the liquid volume, the liquid within the plates will be physically moved but only within the plates. There will be a slight disturbance of liquid entering and leaving the plated section but the effect on the separation efficiency is considered to be small. There will also be a relative movement between the liquid in the downcomer tubes and the bulk liquid in the tank but this disturbance is also considered to have minimum effect on the separation efficiency.

Figure 7:
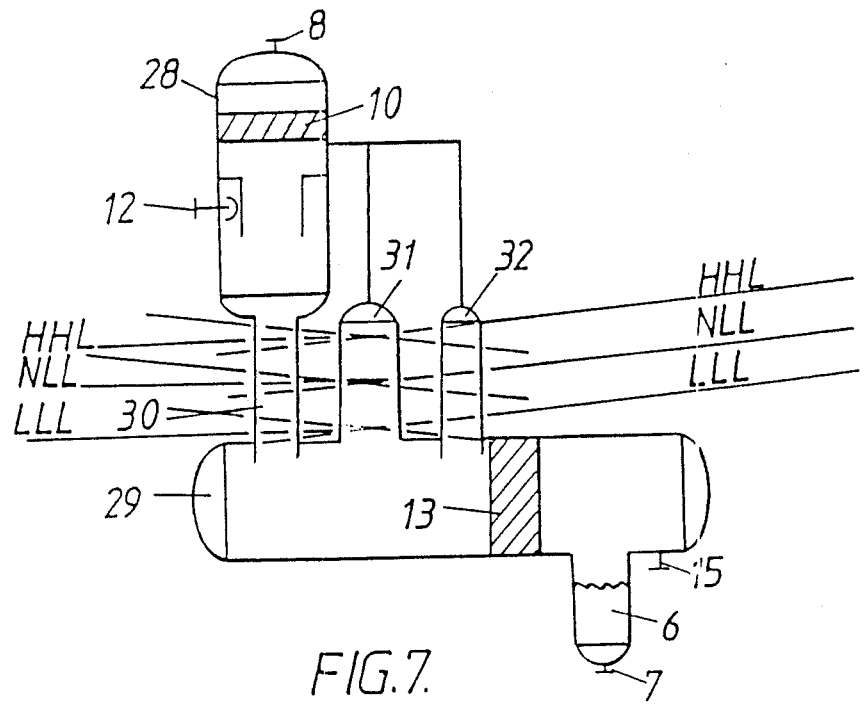
FIG. 7 is a diagrammatic side elevation of a fourth embodiment of a fluid separation apparatus according to the invention.

By having two individual separator tanks connected by downcomer tubes, it is possible to dimension the two tanks as separate items. It is not essential that both tanks should be horizontal and FIG. 7 shows an embodiment of a fluid separator apparatus according to the invention in which the gas/liquid separation is carried out in a vertical upper tank 28 and the liquid/water separation is carried out in a horizontal lower tank 29. The two tanks are connected by three downcomer tubes 30, 31 and 32 with a vent from the top of the central downcomer tube 31 and outlet downcomer tube 32, so that the liquid levels HLL, NLL and LLL are free to move to minimize liquid movement and also enable adequate level control to be effected. At the same time the distance between the downcomer tubes is reduced thus minimising the height of the downcomer tubes to limit the effect of the pitch of the vessel.

The fluid separator apparatus of the present invention has a number of advantages in that it is smaller and lighter compared with the existing design of separators currently used for the same duties and in the same environmental conditions.

The weight of the apparatus of the present invention is estimated to be 70 to 80% of existing designs with a corresponding reduction in cost. The base support area is less than existing separators, although the overall height is greater. In general terms the improved separator is more compact and efficient.

The location of conventional separators have to be as near as possible to the centre of gravity of the moving vessel or vehicle to minimize the effect of the motion of the vessel on separation efficiency whereas the improved separator according to the present invention can be located virtually anywhere on the carrying vessel or vehicle with the minimum effect on separation efficiency.

The term "vessel" where used in this specification is intended to cover any apparatus or installation which is capable of movement in any direction or combination of directions and includes ships, drilling or production platforms, boats, barges or any other floating vessels as well as moving equipment or vehicles including, for example, road tankers The term "tank" where used in this specification is intended to cover any container having any suitable shape and configuration and intended to contain any liquid or gas at any pressure.

The invention is not restricted to the above-described embodiments but modifications and variations may be made without departing from the scope of the invention. For example, the downcomer tubes need not have the same cross-sectional area but may differ in area of desired. It is also not essential that the outer downcomer tubes be equi-spaced from the central tube although this is preferred. Further, five or even more downcomer tubes may be provided between the upper and lower vessels if desired. In a further modification, the boot 6 may be dispensed with if the water outlet nozzle 7 is located on the base of the lower tank.

Figure 8:
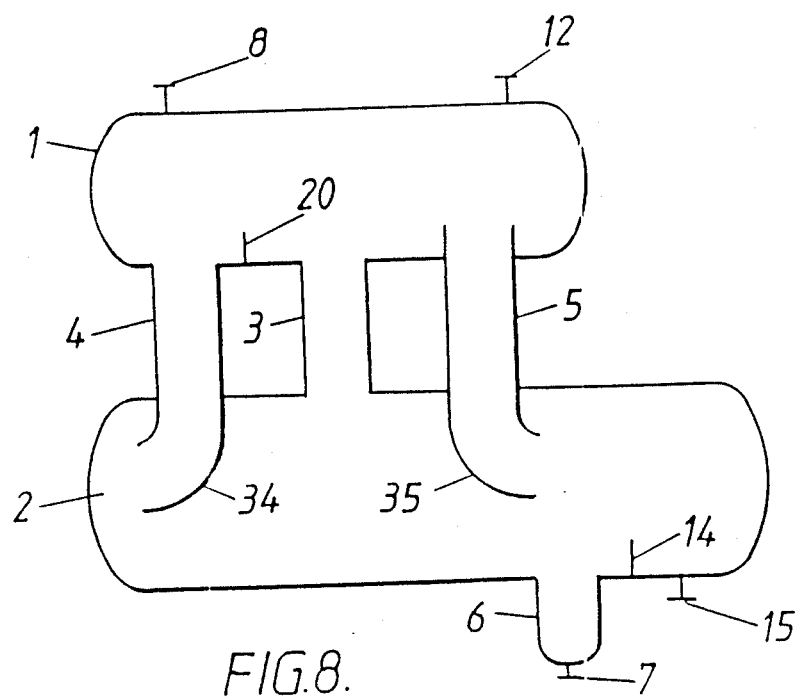
FIG. 8 is a diagrammatic side elevation of a modified form of the embodiment shown in FIG. 3.

A further modification is illustrated in FIG. 8 of the drawings in which the outer downcomer tubes 4 and 5 terminate at their lower ends in right-angled bends 34 and 35 respectively which face away from each other and towards the respective ends of the lower tank 2. This arrangement has the effect of minimising the piston effect of the liquid up and down the downcomer tubes owing to horizontal movement, or horizontal component of movement, of the liquid. This modification may be applied to any one of the embodiments shown in FIGS. 3, 4, 6 or 7 of the drawings. Alternatively or in addition, a restriction in the form of a plate with holes or a like baffle may be installed in each of the downcomer tubes in order to restrict the velocity of liquid in said tubes.

The invention also extends to floating or moving vessels or vehicles equipped with the above-described apparatus.

I claim:

1. Apparatus for a moving vessel or vehicle for separating gases and liquids, said apparatus comprising a container adapted to receive a mixture of gas and liquid and including at least two tanks which are connected by a plurality of tubes, each tube being located in the upper wall of a first tank which is located at a lower level than a second tank and said tubes being spaced apart, and means to maintain the liquid/gas interface at a substantially constant level within each tube so as to reduce agitation of the liquid/gas interface during movement of the vessel or vehicle.

2. Apparatus according to claim 1, wherein said tubes comprise a first tube and at least one second tube located on each side of the first tube and spaced therefrom.

3. Apparatus according to claim 2, wherein the said second tubes are equi-spaced from the first tube on either side thereof.

4. Apparatus according to claim 3, wherein the second tubes are of equal cross-section or diameter.

5. Apparatus according to claim 1, wherein said means to maintain the liquid/gas interface at a substantially constant level within each tube are located at least in the first tube.

6. Apparatus according to claim 5, wherein said means comprise a standpipe in the centre of the first tube having liquid level control connections to ensure that the level remains constant no matter to what degree of movement to which the vessel is subjected.

7. Apparatus according to claim 1, wherein the second tank is arranged horizontally parallel to and above the first tank.

8. Apparatus according to claim 1, wherein the second tank extends vertically above the first tank.

9. Apparatus according to claim 1, wherein the first tank is larger than the second tank.

10. Apparatus according to claim 1, wherein the tubes extend into the tanks and terminate in the interiors of the respective tanks.

11. Apparatus according to claim 1, wherein a third tank is provided which is located below the first tank and connected to it by a plurality of further tubes, a first of said further tubes being located in the upper wall of the third tank and at least one further tube being located on each side of and spaced from the first of said further tubes and also being located in the said upper wall of the third tank.

12. A floating or moving vessel or vehicle equipped with apparatus for separating gases and liquids, said apparatus comprising a container adapted to receive a mixture of gas and liquid and including at least two tanks which are connected by a plurality of tubes, each tube being located in the upper wall of a first tank which is located at a lower level than a second tank and said tubes being spaced apart, and means to maintain the liquid/gas interface at a substantially constant level within each tube so as to reduce agitation of the liquid/gas interface during movement of the vessel or vehicle.

* * * * *